United States Patent
Zlotnick

(10) Patent No.: US 12,493,667 B2
(45) Date of Patent: Dec. 9, 2025

(54) OUTLIER DETECTION IN A DEEP NEURAL NETWORK USING T-WAY FEATURE COMBINATIONS

(71) Applicant: International Business Machines Corporation, Armonk, NY (US)

(72) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 17/039,063

(22) Filed: Sep. 30, 2020

(65) Prior Publication Data
US 2022/0101068 A1    Mar. 31, 2022

(51) Int. Cl.
| | | |
|---|---|---|
| G06F 18/2433 | (2023.01) | |
| G06F 17/18 | (2006.01) | |
| G06F 18/211 | (2023.01) | |
| G06F 18/214 | (2023.01) | |
| G06N 3/04 | (2023.01) | |
| G06N 3/08 | (2023.01) | |

(52) U.S. Cl.
CPC .......... *G06F 18/2433* (2023.01); *G06F 17/18* (2013.01); *G06F 18/211* (2023.01); *G06F 18/214* (2023.01); *G06N 3/04* (2013.01); *G06N 3/08* (2013.01)

(58) Field of Classification Search
CPC .. G06F 18/2433; G06F 18/211; G06F 18/214; G06F 17/18; G06N 3/04; G06N 3/08
See application file for complete search history.

(56) References Cited

U.S. PATENT DOCUMENTS

| | | | | |
|---|---|---|---|---|
| 7,277,843 | B1* | 10/2007 | Wen | ........................ H04L 43/16 709/224 |
| 10,691,980 | B1* | 6/2020 | Guendel | ................... G06T 7/70 |
| 2009/0228411 | A1 | 9/2009 | Matsumoto | |
| 2011/0039282 | A1* | 2/2011 | Hartman | ............ G01N 33/6893 435/7.92 |

(Continued)

FOREIGN PATENT DOCUMENTS

| | | |
|---|---|---|
| CN | 104783782 B | 9/2017 |
| CN | 111259000 A | 6/2020 |

(Continued)

OTHER PUBLICATIONS

Kuhn et al.; An Application of Combinatorial Methods for Explainability in Artificial Intelligence and Machine Learning; May 22, 2019; Nation Institute of Standards and Technology; NIST Cybersecurity White Paper; pp. 1-5. (Year: 2019).*

(Continued)

*Primary Examiner* — Kyle R Stork
(74) *Attorney, Agent, or Firm* — Sigalit Portner; Andrew D. Wright; Calderon Safran & Wright P.C.

(57) ABSTRACT

Outlier detection using a Deep Neural Network (DNN) includes running a trained DNN model on an received input item. A first feature vector is extracted from the input item and quantized to discrete values. A first number of special t-way feature combinations are computed in the input item and compared against a computed threshold. Based on the comparison, the input item is flagged as an outlier and an alert is generated notifying of the flagged input item.

20 Claims, 7 Drawing Sheets

(56) References Cited

U.S. PATENT DOCUMENTS

| | | | |
|---|---|---|---|
| 2019/0325321 A1* | 10/2019 | Swanson | G06F 18/2433 |
| 2020/0074269 A1 | 3/2020 | Trygg | |
| 2020/0074401 A1* | 3/2020 | Oliveira Almeida | G06F 18/2321 |
| 2020/0076677 A1 | 3/2020 | Mermoud | |
| 2020/0322703 A1* | 10/2020 | Bures | G06N 20/00 |
| 2022/0215296 A1* | 7/2022 | Chen | G06N 5/01 |
| 2022/0366671 A1* | 11/2022 | López González | G06N 3/045 |

FOREIGN PATENT DOCUMENTS

| | | |
|---|---|---|
| CN | 116034377 A | 4/2023 |
| DE | 112021005115 T5 | 7/2023 |
| EP | 3582142 A1 | 12/2019 |
| GB | 2617915 A | 10/2023 |
| JP | 2023-543489 A | 10/2023 |
| WO | 2019228358 A1 | 12/2019 |
| WO | 2020049087 A1 | 3/2020 |
| WO | 2020/156924 A1 | 8/2020 |

OTHER PUBLICATIONS

Dola et al.; Input Distribution Coverage: Measuring Feature Interaction Adequacy in Neural Network Testing; Apr. 2023; ACM Transactions on Software Engineering and Methodology; vol. 32, No. 3. Article 81; pp. 81:6-81:40. (Year: 2023).*

"Using Standard deviation in Normal Distribution," 2020, <https://stats.stackexchange.com/questions/476677/understanding-standard-deviation-in-normal-distribution>, pp. 1-3. (Year: 2020).*

International Search Report and Written Opinion, International Application No. PCT/IB2021/058530, Mailed Dec. 30, 2021, 6 pages.

Zlotnick, et al., "Outlier Detection in a Deep Neural Network Using T-Way Feature Combinations", International Application No. PCT/IB2021/058530, International Filing Date Sep. 30, 2021, 35 pages.

Flovik, Vegard, "How to use machine learning for anomaly detection and condition monitoring", Dec. 31, 2018, 12 pages, <https://towardsdatascience.com/how-to-use-machine-learning-for-anomaly-detection-and-condition-monitoring-6742f82900d7>.

Gebresilassie, Abel, "Neural Networks for Anomaly (Outliers) Detection", Good Audience, Jun. 18, 2018, 19 pages, <https://blog.goodaudience.com/neural-networks-for-anomaly-outliers-detection-a454e3fdaae8>.

Geifman, et al., "SelectiveNet: A Deep Neural Network with an Integrated Reject Option", Proceedings of the 36th International Conference on Machine Learning, PMLR 97, 2019, 10 pages, <https://arxiv.org/pdf/1901.09192.pdf>.

Kieu, et al., "Outlier Detection for Multidimensional Time Series using Deep Neural Networks", 2018 19th IEEE International Conference on Mobile Data Management, pp. 125-134.

Ma, et al., "Combinatorial Testing for Deep Learning Systems", arXiv:1806.07723v1, Jun. 20, 2018, 14 pages, <https://arxiv.org/abs/1806.07723>.

Ma, et al., "DeepGauge: Multi-Granularity Testing Criteria for Deep Learning Systems", ASE '18, Sep. 3-7, 2018, 12 pages, <https://arxiv.org/abs/1803.07519>.

Mell et al., "The NIST Definition of Cloud Computing", National Institute of Standards and Technology, Special Publication 800-145, Sep. 2011, 7 pages.

Meng, et al., "MagNet: a Two-Pronged Defense against Adversarial Examples", ACM Conference on Computer and Communications Security (CCS), 2017, Sep. 11, 2017, 13 pages, <https://arxiv.org/abs/1705.09064>.

Qiu, et al., "Review of Artificial Intelligence Adversarial Attack and Defense Technologies", Applied Sciences 9(5):909, Mar. 2019, 29 pages, <https://www.researchgate.net/publication/331499625_Review_of_Artificial_Intelligence_Adversarial_Attack_and_Defense_Technologies>.

Vilkomir, et al., "Combinatorial Methods of Feature Selection for Cell Image Classification", 2017 IEEE International Conference on Software Quality, Reliability and Security (Companion Volume), 2017, pp. 55-60.

Wang, et al., "Effective End-to-end Unsupervised Outlier Detection via Inlier Priority of Discriminative Network", 33rd Conference on Neural Information Processing Systems (NeurIPS 2019), 14 pages, <https://papers.nips.cc/paper/8830-effective-end-to-end-unsupervised-outlier-detection-via-inlier-priority-of-discriminative-network.pdf>.

Japan Patent Office, "Notice of Reasons for Refusal," Jan. 14, 2025, 6 Pages, JP Application No. 2023-519802.

* cited by examiner

OUTLIER DETECTION IN A DEEP NEURAL NETWORK USING T-WAY FEATURE COMBINATIONS

BACKGROUND

The present invention generally relates to the field of machine learning, and more particularly to a method, system and computer program product for using Deep Neural Network (DNN) models to perform outlier detection.

Outlier detection (or anomaly detection) is the identification of data points or patterns in data that do not conform to a notion of normal behavior. The ability to detect anomalous behavior can provide useful insights across industries since anomalous data is frequently connected to problems or rare events such as medical problems, structural defects, malfunctioning equipment, etc. Particularly, in medical imaging procedures, detection of outliers is very important for accurate interpretation and diagnosis. In general, detection of outliers and relevant features is an important process before classification.

On the other hand, DNNs have demonstrated an ability to proceed efficiently with large amounts of data. DNNs have the greater efficiency of the non-linear transformation and data representation in comparison with traditional neural networks. Specifically, DNNs can perform a deep hierarchical transformation of images in the input space. Moreover, DNNs, thanks to a multi-layer architecture, can process and analyze large amount of data, as well as modeling the cognitive processes in various fields. However, DNNs depend heavily on the set of inputs used for training.

SUMMARY

The present disclosure recognizes the shortcomings and problems associated with outlier detection methods and DNNs. Particularly, the need for large training data sets and the unpredictability of outputs on a type of image or input item that has not previously been seen by the DNN model. This may cause, for example, a corrupt image that was not represented in the training data set to go unnoticed with whatever classification the DNN gave it. In another example, a DNN model trained with mammogram images that had no implants may produce erroneous results when presented with an image including an implant. Therefore, there is a need for a method and system for outlier detection in a deep neural network using t-way feature combinations capable of collecting statistics of feature vector values generated from a trained DNN to flag abnormal input items (e.g., images) with minimal impact on normal input items.

Shortcomings of the prior art are overcome and additional advantages are provided through the provision of a computer-implemented method for outlier detection that includes receiving, by one or more processors, an input item. The one or more processors run a deep neural network model on the input item and extract a first feature vector from the input item that is subsequently quantized to discrete values. The one or more processors compute a first number of special t-way feature combinations in the input item and compare the computed first number of special t-way feature combinations against a computed threshold. Based on the comparison, the one or more processors flag the input item as an outlier and generate an alert including the flagged input item.

Another embodiment of the present disclosure provides a computer program product for outlier detection, based on the method described above.

Another embodiment of the present disclosure provides a computer system for outlier detection, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention provide a method, system, and computer program product for outlier detection in a DNN using t-way feature combinations. The following described exemplary embodiments provide a system, method, and computer program product to, among other things, analyze DNN feature vectors computed during training, find features that appear to be significant in the training set (outliers), based on the significant features, the proposed method analyzes feature vectors computed during production, flags inputs in which the significant features are not represented well, and performs statistical analysis to compare prevalence of significant features in training with that of production. Thus, the present embodiments have the capacity to improve the technical field of machine learning by using t-way feature combinations in deep neural networks to flag abnormal images (outliers) with minimal impact on normal images. Specifically, impact on normal images can be substantially reduced by tuning thresholds so that normal images are flagged only rarely. Moreover, the present embodiments can help avoiding the costly process of training a DNN for detecting outliers.

Figure 1:
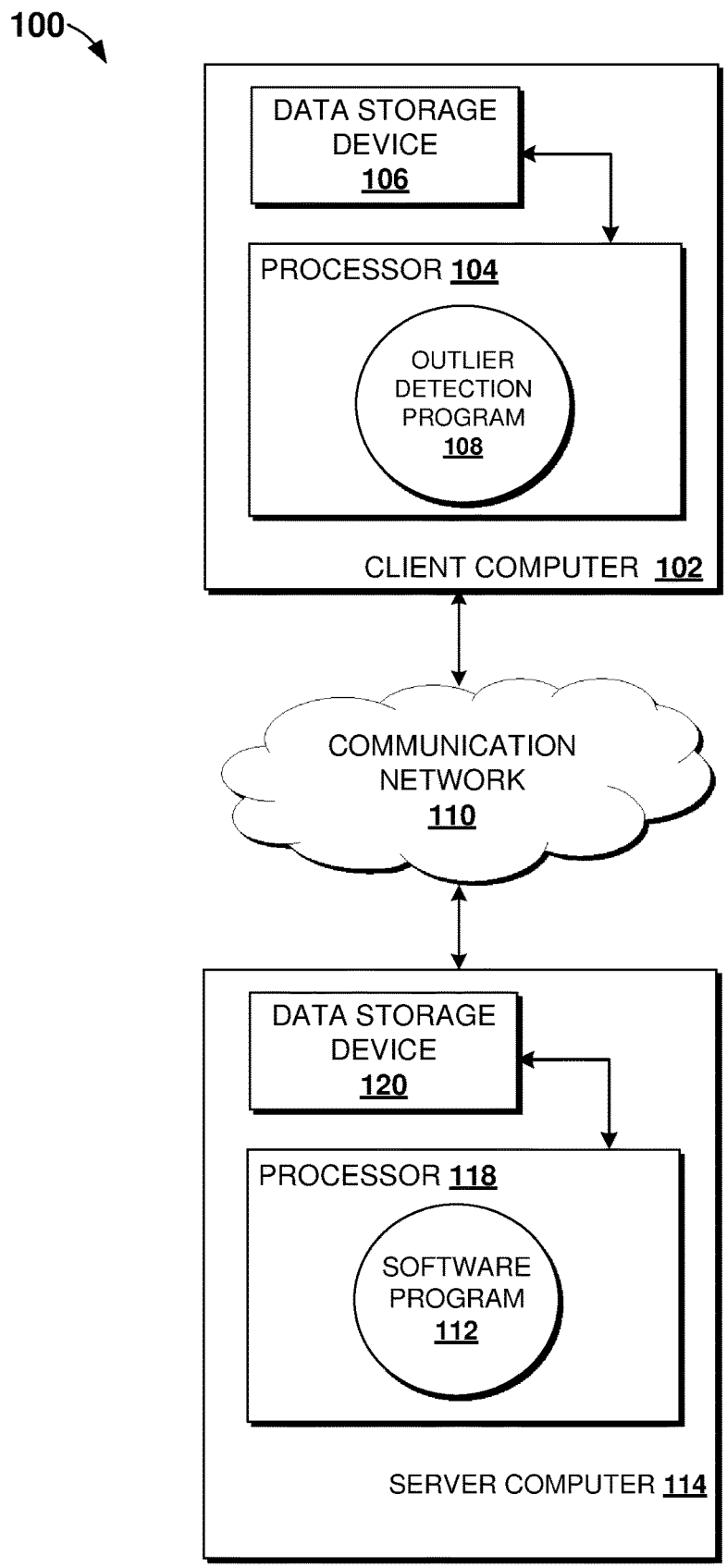
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run an outlier detection program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The outlier detection program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
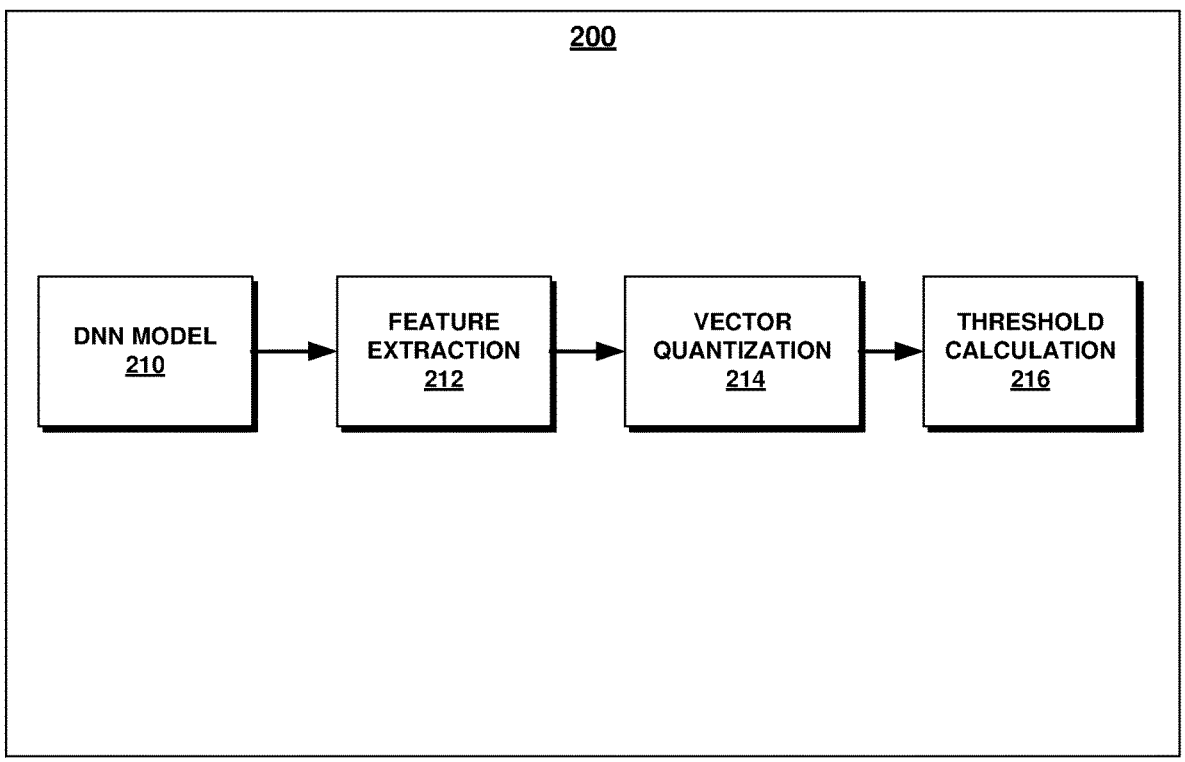
FIG. 2 depicts a system for outlier detection in a deep neural network using t-way feature combinations, according to an embodiment of the present disclosure.

Referring now to FIG. 2, a system 200 for outlier detection in a DNN using t-way feature combinations is shown, according to an embodiment of the present disclosure. In this embodiment, a DNN model 210 is used to run a prediction on a training dataset including a plurality of input items (hereinafter "input items"). The input items may include, but are not limited to, X-ray images such as mammograms and other diagnostic imaging pictures. As known by those skilled in the art, DNNs learn a mapping function from inputs to outputs by updating the weights of the network in response to the errors the model makes on the training dataset. Updates are made to continually reduce this error until either a good enough model is found or the learning process gets stuck and stops.

Subsequently, a feature extraction process is conducted by a feature extraction engine 212, in which a feature vector (e.g., the last of the fully connected layers) is generated from all inputs. The extracted feature vector is fed to a vector quantization engine 214, as shown in the figure.

According to an embodiment, outliers can be recognized by having a large number of rare t-way combinations. The vector quantization engine 214 quantizes the extracted feature vector to discrete values (e.g., below or above the median of the values in all the feature vectors of the training dataset) and counts occurrences of t-way feature combinations in the training dataset. For instance, for t=2, every two features in the feature vector may have four combinations 00,01,10,11, each of which is counted separately. Further, for every item in the training dataset, the vector quantization engine 214 counts the number of rare t-way feature combinations, i.e. combinations that occur less than n times, for every n<N, where N represents a relatively small number of t-way combinations. For example, when N=5, for every n<N means that count combinations that appeared 0, 1, 2, 3, or 4 times are counted separately. This count does not include the occurrence of the feature combination in the processed item.

A threshold calculation engine 216 computes a count threshold for every n<N. For example, the count threshold may be calculated as a mean (m) of the count of rare t-way feature combinations plus a standard deviation (s) of the count of rare t-way feature combinations plus a square root (sqrt) of the count of rare t-way feature combinations, as indicated in Equation 1 below:

$$\text{Count Threshold}(n<N)=\mu(\text{count})+\sigma(\text{count})+\text{sqrt}(\text{count}) \quad \text{Eq. (1)}$$

Accordingly, when a count of the number of rare t-way feature combinations exceeds the calculated count threshold the corresponding input item is flagged as an outlier.

Additionally or alternatively, the training set can be refined by filtering input items that are outliers with respect to the majority of the training input items. This step may be useful when it is suspected that there may be outliers in the training dataset. The filtering is done by iterating over the training input items, removing input items in which any of the counts is higher than the count threshold, and computing the thresholds again. As known by those skilled in the art, having a cleaner training dataset is likely to improve the analysis at production time.

After training, the system 200 can be used for detecting outliers in a determined input (production). Accordingly, given an input item, a DNN prediction is run, a feature vector is extracted and quantized using the same operations as in the training instance described above. The training counts can be retrieved for each of the t-way feature combinations in the input item, as previously explained. For every n<N, if the number of t-way combinations whose training count n is more than the count threshold for n, the input item is flagged as an outlier.

According to another embodiment, outliers can be recognized by having a low number of "significant" t-way feature combinations. The vector quantization engine 214 quantizes the extracted feature vector to discrete values (e.g., below or above the median of the values in all the feature vectors of the training dataset) and counts occurrences of t-way feature combinations in the training dataset, as described above. However, in this embodiment, the vector quantization engine 214 calculates a probability of each feature value, in the extracted feature vector, with respect to values of that feature in all the training dataset.

Further, the vector quantization engine 214 defines as "significant" t-way combinations of features that appear together significantly more than their probability suggest. For example, if the probability of a feature 3 to be 1 is 0.5, and the probability of a feature 17 is 0.7, it is expected that a probability of both being 1 is 0.35. If, in fact, it is found that, for example, in 50 of 100 samples both feature 3 and feature 17 are 1, the combination of feature 3 and feature 17 is defined as "significant".

In this embodiment, the threshold calculation engine 216 computes the mean (m) and standard deviation (s) of a count of the number of significant t-way feature combinations per training input and calculates the count threshold as indicated below:

$$\text{Count Threshold} = \mu(\text{count}) - 5*\sigma(\text{count}) \quad \text{Eq. (2)}$$

When a count of the number of significant t-way feature combinations for a given input is significantly lower than the mean computed on the training dataset, the input is flagged as an outlier. As indicated by Eq. (2) above, significantly lower may be, for example, 5 standard deviations less than the mean of the count of significant t-way feature combinations.

After training, the system 200 can be used for detecting outliers in a determined input (production). Accordingly, as explained above, when an input item is provided, the system 200 runs a DNN prediction, extracts a feature vector, and quantizes the extracted features using the same operations as in the training embodiment described above (e.g., using the mean of significant t-way feature combinations in the training dataset as a reference for flagging input items). Thus, in this alternate embodiment, when a count of the number of significant t-way feature combinations for a given input is significantly lower than the computed mean of the training dataset, the input is flagged as an outlier.

Figure 3A:
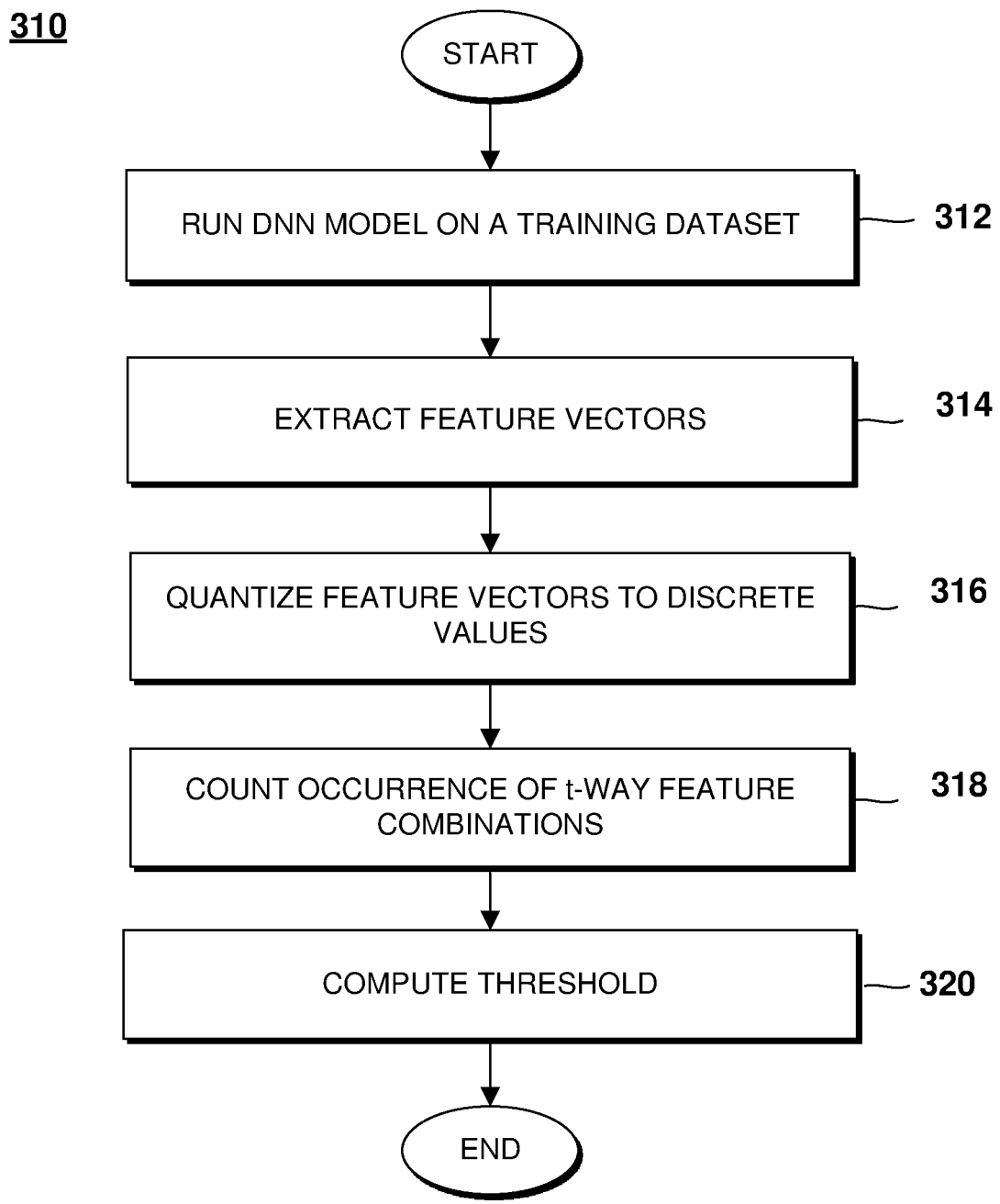
FIG. 3A depicts a flowchart illustrating the steps of a computer-implemented method for using a deep neural network model for outlier detection using t-way feature combinations, according to an embodiment of the present disclosure.

Referring now to FIG. 3A, a flowchart 310 illustrating the steps of a computer-implemented method for outlier identification is shown, according to an embodiment of the present disclosure. Specifically, the flowchart 310 depicts the steps required for training a DNN model for outlier detection using t-way feature combinations.

At step 312, a DNN model is run on a training dataset including a plurality of training input items (hereinafter "training input items"). As mentioned above, the training input items can include, for example, X-ray images such as mammograms. At step 314, feature vectors are extracted from the processed training dataset. Extracted feature vectors are subsequently quantize, at step 316, to discrete values, as previously explained above with reference to FIG. 2. At step 318, a count of occurrences of t-way feature combinations in the quantized feature vector is determined, and used to calculate a threshold for outlier identification.

In an embodiment, at step 318, for every training input item in the training dataset, a count of the number of t-way feature combinations that occur less than n times, for every n<N, where N is, for example 5, is determined. It should be noted that this count does not include the occurrence of the feature combinations in the processed item. Specifically, since every feature combination in the examined input item exists at least once, when filtering the training dataset, it must be taken into account the fact that this input item was counted, and modify the count accordingly.

Then, in this embodiment, a count threshold is calculated at step 320 for every n<N by performing a sum of the mean (m) of the count of t-way feature combinations, the standard deviation (s) of the count of t-way feature combinations, and the square root (sqrt) of the count of t-way feature combinations, as indicated in Equation 1 above. Thus, in this embodiment, when a count of the number of rare t-way feature combinations exceeds the calculated count threshold (according to Eq. (1)), the corresponding training input item (e.g., image) is flagged as an outlier.

In another or alternate embodiment, at step 318, after determining a count of occurrences of t-way feature combinations in the training dataset, a probability of each feature value, in the extracted feature vector, with respect to values of that feature in all the training dataset is determined, and based on this determination, t-way combinations of features that appear together significantly more than their probabilities are identified as significant t-way combinations. In this embodiment, the mean (m) and standard deviation (s) of a count of the number of significant t-way feature combinations per training input can be calculated, and, at step 320, a threshold for image flagging is set. For example, the threshold may be computed as the mean (m) of a count of the number of significant t-way feature combinations minus 5 times the standard deviations (s), as indicated in Eq. (2) above. Consequently, when a count of the number of "significant" t-way feature combinations for a given input is lower than the computed threshold, the input item is flagged as an outlier.

Figure 3B:
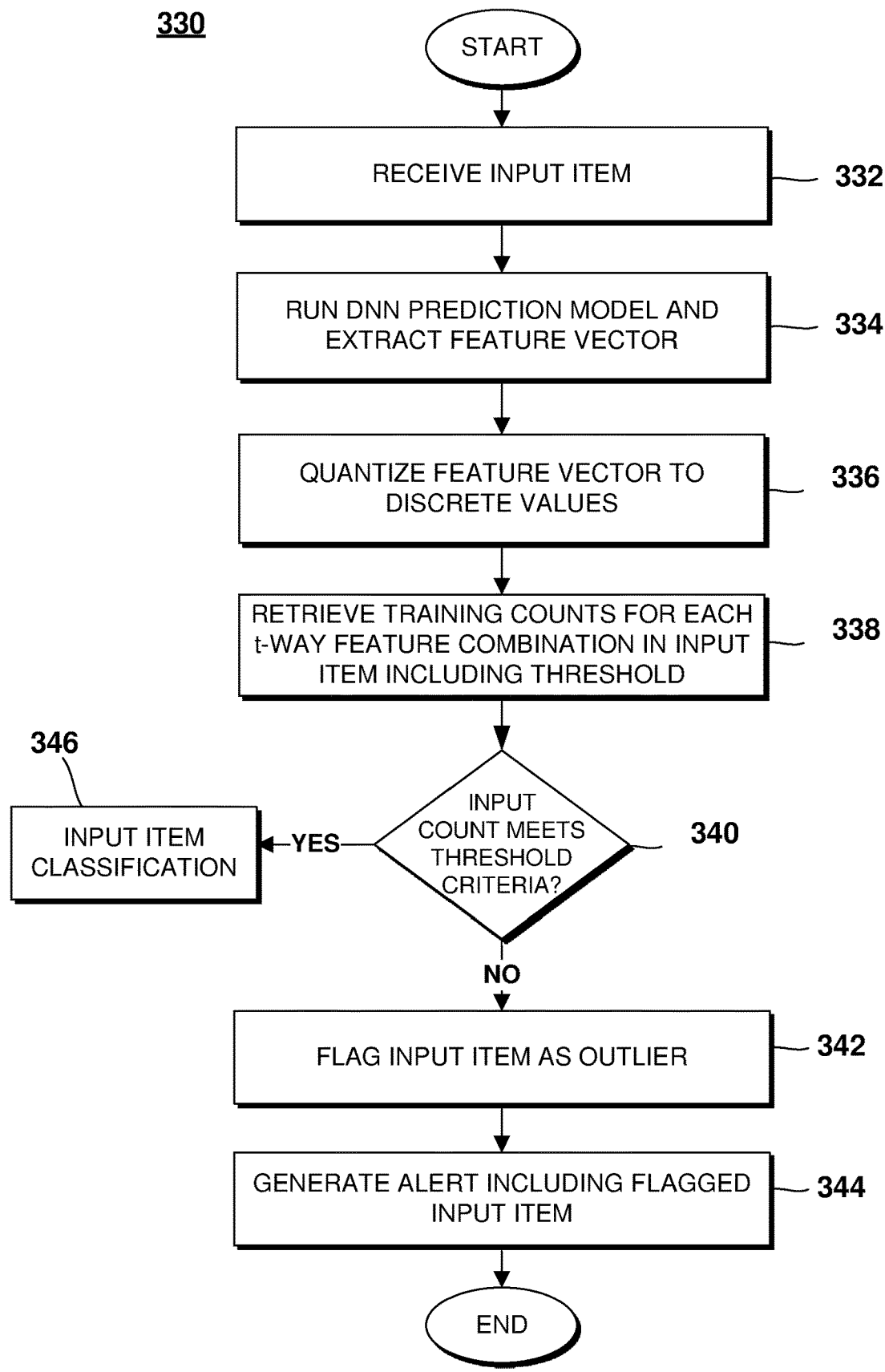
FIG. 3B depicts a flowchart illustrating an example implementation of the computer-implemented method of FIG. 3A for outlier detection using t-way feature combinations, according to an embodiment of the present disclosure.

Referring now to FIG. 3B, a flowchart 330 illustrating an example implementation of the computer-implemented method of FIG. 3A for outlier detection using t-way feature combinations is shown, according to an embodiment of the present disclosure.

In this embodiment, at step 332, an input item including, for example, an X-ray image is received. At step 334, the DNN prediction model is run and feature vector extracted for the received input item in the way described above with reference to FIG. 3A. Similar to step 316 of FIG. 3A, at step 336, the extracted feature vector is quantize to discrete values. At step 338, training counts for each t-way feature combination in the input item are retrieved including the computed threshold for outlier identification described above with reference to steps 318 and 320 of FIG. 3A.

At step 340, it is determined whether the input count meets the threshold criteria. If the input count does not meet the threshold criteria, as defined in FIG. 3A, the input item (e.g., X-ray image) is flagged as an outlier at step 342, and an alert including information regarding the flagged input item is generated at step 344. The alert may include, but is not limited to, an audio notification, a video notification, and/or haptic feedback. If the input count meets the threshold criteria, the input item proceeds to be classified at step 346.

Therefore, embodiments of the present disclosure provide a method, system and computer program product to, among other things, analyze DNN feature vectors, record which feature combinations are present, and flag production inputs in which a significant number of non-recorded features are present. Stated differently, embodiments of the present disclosure detect outliers in a DNN using rare t-way feature combinations by analyzing feature vectors computed in production, and flagging inputs in which these significant features are not represented well. According to another embodiment, statistical analysis is performed to compare prevalence of significant features in training with that of production (t-way feature combinations are considered for defining significance: t-way combinations of features that appear together significantly more that their 1-way probabilities would suggest are defined as significant).

Figure 4:
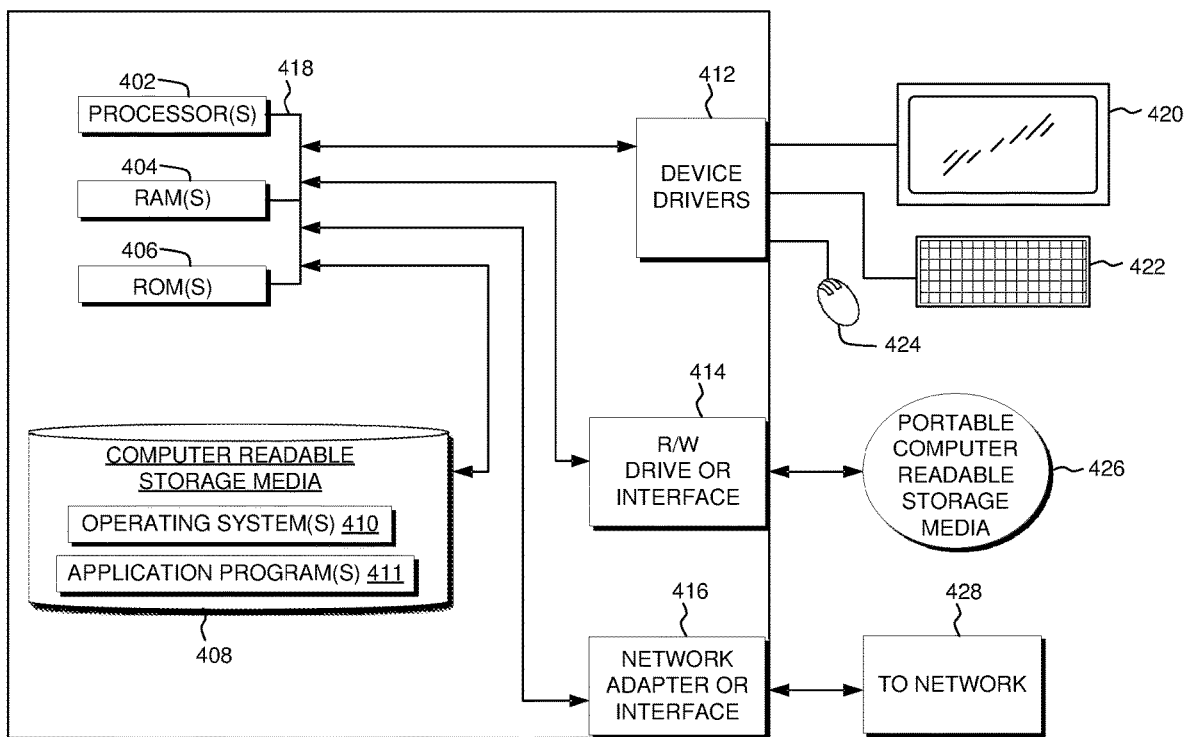
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
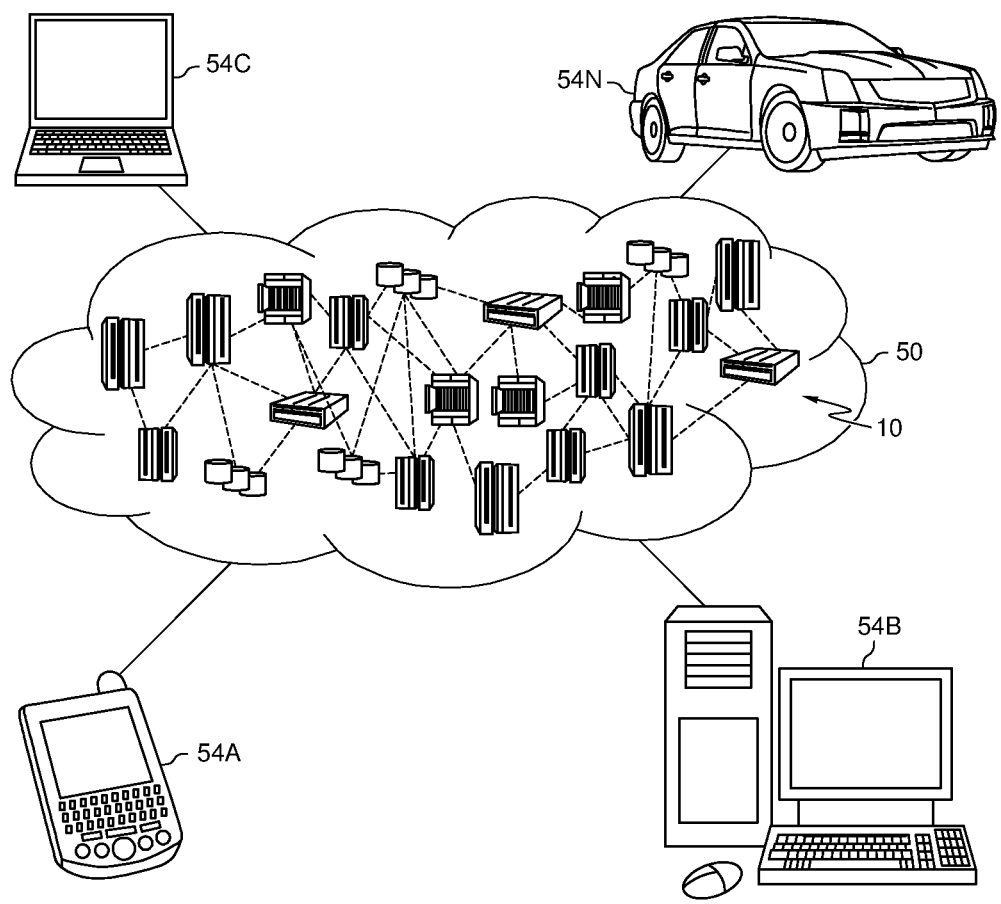
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
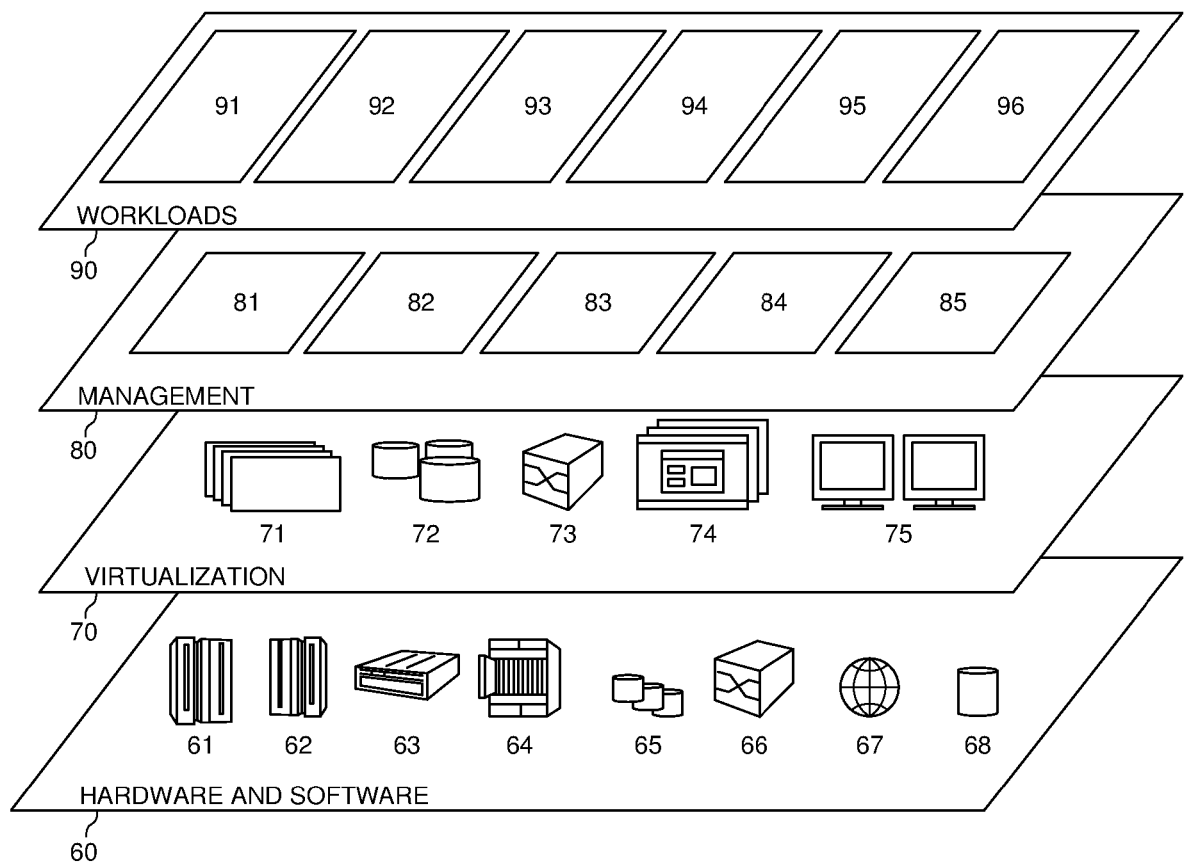
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for outlier detection in a deep neural network using t-way feature combinations 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for outlier detection, comprising:
   receiving, by one or more processors, an input item comprising an X-ray image;
   running, by the one or more processors, a prediction on a training dataset including the input item by utilizing a deep neural network model;
   performing, by the one or more processors, a learning process on a mapping function from inputs to outputs by updating weights of a network in response to errors that occur in the prediction by the deep neural network model on the training dataset;
   continually updating, by the one or more processor, the weights of the network to reduce the errors to a predetermined level;
   extracting, by the one or more processors, a first feature vector from the input item;
   quantizing, by the one or more processors, the extracted first feature vector to discrete values, the discrete values being below or above a median value of the extracted first feature vector from the input item;
   computing, by the one or more processors, a first number of special t-way feature combinations in the input item;
   computing, by the one or more processors, a computed threshold comprising calculating a mean (m) of a count of rare t-way feature combinations for every input item in a training dataset plus a standard deviation(s) of the count of rare t-way feature combinations plus a square root (sqrt) of the count of rare t-way feature combinations per input item in the training dataset, wherein the count of rare t-way feature combinations does not include the occurrence of feature combinations in the input item;
   comparing, by the one or more processors, the computed first number of special t-way feature combinations against the computed threshold;
   based on the comparison, flagging, by the one or more processors, the input item as an outlier comprising an abnormal X-ray image with an impact on normal input items being reduced by at least one predetermined tuning threshold;
   filtering, by the one or more processors, the input item as the outlier comprising the abnormal X-ray image from the training dataset;
   training, by the one or more processors, the deep neural network model based on the training dataset with the filtered input item; and
   generating, by the one or more processors, an alert comprising the flagged input item, wherein the alert comprises a video notification.

2. The method of claim 1, wherein the computed threshold is computed as the mean (m) of the count of a number of significant t-way feature combinations minus a multiple of the standard deviations(s), and
   wherein running the deep neural network on the input item further comprises:
   training the deep neural network for outlier detection, the training comprising:
   running, by the one or more processors, the deep neural network on a training dataset;
   extracting, by the one or more processors, a second feature vector from the training dataset;
   quantizing, by the one or more processors, the extracted second feature vector to discrete values;
   determining, by the one or more processors, a count of occurrences of t-way feature combinations in the training dataset, wherein the count of occurrences of t-way feature combinations in the training dataset does not include the occurrence of the feature combination in the training dataset;
   based on the count of occurrences of the t-way feature combinations in the training dataset, defining, by the one or more processors, a second number of special t-way feature combinations;
   calculating, by the one or more processors, the computed threshold for the defined second number of special t-way feature combinations per training input item in the training dataset; and
   tuning, by the one or more processors, the at least one predetermined tuning threshold to reduce flagging of the normal input items.

3. The method of claim 2, wherein the first number of special t-way feature combinations in the input item and the second number of special t-way feature combinations in the training dataset comprise a number of rare t-way feature combinations that occur less than n times, for every n<N, wherein N represents a number of t-way combinations of five or fewer.

4. The method of claim 3, wherein the computed threshold for the second number of special t-way feature combinations equals the computed threshold for the first number of special t-way feature combinations.

5. The method of claim 4, wherein comparing the computed first number of special t-way feature combinations against the computed threshold further comprises:
   based on the count of rare t-way feature combinations exceeding the computed threshold, flagging, by the one or more processors, the input item as outlier.

6. The method of claim 2, wherein the first number of special t-way feature combinations in the input item and the second number of special t-way feature combinations in the training dataset comprise a number of significant t-way feature combinations, the number of significant t-way feature combinations comprising t-way combinations of features that appear together more than it is suggested by one or more probabilities.

7. The method of claim 6, wherein calculating the computed threshold for the second number of special t-way feature combinations in the training dataset comprises:
calculating, by the one or more processors, a mean (m) of a count of the number of significant t-way feature combinations per input item in the training dataset minus five times a standard deviation(s) of the count of the number of significant t-way feature combinations wherein the count of the number of significant t-way feature combinations does not include the occurrence of the feature combinations in the input item.

8. The method of claim 7, wherein comparing the computed first number of special t-way feature combinations against the computed threshold further comprises:
based on the count of significant t-way feature combinations in the input item being lower than the computed threshold, flagging, by the one or more processors, the input item as an outlier
filtering input items that are outliers with respect to a majority of the input items based on the flagging;
tuning the computed threshold based on the filtering; and
based on the filtering, flagging, by the one or more processors, the input item as an outlier.

9. The method of claim 1, wherein the training dataset comprises X-ray images, the alert comprises haptic feedback, and the predetermined level corresponds with a level in which the learning process gets stuck.

10. A computer system for outlier detection, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by one or more processors, an input item comprising an X-ray image;
running, by the one or more processors, a prediction on a training dataset including the input item by utilizing a deep neural network model;
performing, by the one or more processors, a learning process on a mapping function from inputs to outputs by updating weights of a network in response to errors that occur in the prediction by the deep neural network model on the training dataset;
continually updating, by the one or more processor, the weights of the network to reduce the errors to a predetermined level;
extracting, by the one or more processors, a first feature vector from the input item;
quantizing, by the one or more processors, the extracted first feature vector to discrete values, the discrete values being below or above a median value of the extracted first feature vector from the input item;
computing, by the one or more processors, a first number of special t-way feature combinations in the input item;
computing, by the one or more processors, a computed threshold comprising calculating a mean (m) of a count of rare t-way feature combinations for every input item in a training dataset plus a standard deviation(s) of the count of rare t-way feature combinations plus a square root (sqrt) of the count of rare t-way feature combinations per input item in the training dataset, wherein the count does not include the occurrence of feature combinations in the input item;
comparing, by the one or more processors, the computed first number of special t-way feature combinations against the computed threshold;
based on the comparison, flagging, by the one or more processors, the input item as an outlier comprising an abnormal X-ray image with an impact on normal input items being reduced by at least one predetermined tuning threshold;
filtering, by the one or more processors, the input item as the outlier comprising the abnormal X-ray image from the training dataset;
training, by the one or more processors, the deep neural network model based on the training dataset with the filtered input item; and
generating, by the one or more processors, an alert comprising the flagged input item, wherein the alert comprises an audio notification.

11. The computer system of claim 10, wherein the audio notification comprises audible information regarding the flagged input item, and
wherein running the deep neural network on the input item further comprises:
training the deep neural network for outlier detection, the training comprising:
running, by the one or more processors, the deep neural network on a training dataset;
extracting, by the one or more processors, a second feature vector from the training dataset;
quantizing, by the one or more processors, the extracted second feature vector to discrete values;
determining, by the one or more processors, a count of occurrences of t-way feature combinations in the training dataset;
based on the count of occurrences of the t-way feature combinations in the training dataset, defining, by the one or more processors, a second number of special t-way feature combinations;
calculating, by the one or more processors, the computed threshold for the defined second number of special t-way feature combinations per training input item in the training dataset; and
tuning, by the one or more processors, the at least one predetermined tuning threshold to reduce flagging of the normal input items.

12. The computer system of claim 11, wherein the first number of special t-way feature combinations in the input item and the second number of special t-way feature combinations in the training dataset comprise a number of rare t-way feature combinations that occur less than n times, for every n<N.

13. The computer system of claim 12, wherein calculating the computed threshold for the second number of special t-way feature combinations in the training dataset comprises:
calculating, by the one or more processors, a mean (m) of a count of rare t-way feature combinations for every input item in the training dataset plus a standard deviation(s) of the count of rare t-way feature combinations plus a square root (sqrt) of the count of rare t-way feature combinations per input item in the training dataset.

14. The computer system of claim 13, wherein comparing the computed first number of special t-way feature combinations against the computed threshold further comprises:

based on the count of rare t-way feature combinations exceeding the computed threshold, flagging, by the one or more processors, the input item as an outlier.

15. The computer system of claim 11, wherein the first number of special t-way feature combinations in the input item and the second number of special t-way feature combinations in the training dataset comprise a number of significant t-way feature combinations, the number of significant t-way feature combinations comprising t-way combinations of features that appear together more than it is suggested by one or more probabilities.

16. The computer system of claim 15, wherein calculating the computed threshold for the second number of special t-way feature combinations in the training dataset comprises:
    calculating, by the one or more processors, a mean (m) of a count of the number of significant t-way feature combinations per input item in the training dataset minus five times a standard deviation(s) of the count of the number of significant t-way feature combinations.

17. The computer system of claim 16, wherein comparing the computed first number of special t-way feature combinations against the computed threshold further comprises:
    based on the count of significant t-way feature combinations in the input item being lower than the computed threshold, flagging, by the one or more processors, the input item as an outlier.

18. The computer system of claim 10, wherein the training dataset comprises X-ray images, the alert comprises haptic feedback, and the predetermined level corresponds with a level in which the learning process gets stuck.

19. A computer program product for outlier detection, comprising:
    one or more computer readable storage media, and program instructions collectively stored on the one or more computer readable storage media, the program instructions comprising:
    program instructions to receive, by one or more processors, an input item comprising an X-ray image;
    program instructions to run, by the one or more processors, a prediction on a training dataset including the input item by utilizing a deep neural network model;
    program instructions to perform, by the one or more processors, a learning process on a mapping function from inputs to outputs by updating weights of a network in response to errors that occur in the prediction by the deep neural network model on the training dataset;
    program instructions to continually update, by the one or more processor, the weights of the network to reduce the errors to a predetermined level;
    program instructions to extract, by the one or more processors, a first feature vector from the input item;
    program instructions to quantize, by the one or more processors, the extracted first feature vector to discrete values, the discrete values being below or above a median value of the extracted first feature vector from the input item;
    program instructions to compute, by the one or more processors, a first number of special t-way feature combinations in the input item;
    computing, by the one or more processors, a computed threshold based on a function of a mean (m) of a count of rare t-way feature combinations for every input item in a training dataset and a standard deviation(s) of the count of rare t-way feature combinations, wherein the count does not include the occurrence of feature combinations in the input item;
    program instructions to compare, by the one or more processors, the computed first number of special t-way feature combinations against the computed threshold;
    based on the comparison, program instructions to flag, by the one or more processors, the input item as an outlier comprising an abnormal X-ray image with an impact on normal input items being reduced by at least one predetermined tuning threshold;
    program instructions to filter, by the one or more processors, the input item as the outlier comprising the abnormal X-ray image from the training dataset;
    program instructions to train, by the one or more processors, the deep neural network model based on the training dataset with the filtered input item; and
    program instructions to generate, by the one or more processors, an alert comprising the flagged input item, wherein the alert comprises a video notification and an audio notification.

20. The computer program product of claim 19, wherein the program instructions to run the deep neural network on the input item further comprises:
    program instructions to train the deep neural network for outlier detection comprising:
    program instructions to run, by the one or more processors, the deep neural network on a training dataset;
    program instructions to extract, by the one or more processors, a second feature vector from the training dataset;
    program instructions to quantize, by the one or more processors, the extracted second feature vector to discrete values;
    program instructions to determine, by the one or more processors, a count of occurrences of t-way feature combinations in the training dataset;
    based on the count of occurrences of the t-way feature combinations in the training dataset, program instructions to define, by the one or more processors, a second number of special t-way feature combinations;
    program instructions to calculate, by the one or more processors, the computed threshold for the defined second number of special t-way feature combinations per training input item in the training dataset; and
    program instructions to tune, by the one or more processors, the at least one predetermined tuning threshold to reduce flagging of the normal input items,
    wherein the predetermined level corresponds with a level in which the learning process gets stuck.

* * * * *